United States Patent [19]

Lee

[11] Patent Number: 5,954,161

[45] Date of Patent: Sep. 21, 1999

[54] BRAKING STRUCTURE FOR REHABILITATION TROLLEY

[75] Inventor: Daniel Lee, Taipei, Taiwan

[73] Assignee: Apex Care Industry Inc., Chia-Yeh Hsien, Taiwan

[21] Appl. No.: 08/916,419

[22] Filed: Aug. 22, 1997

[51] Int. Cl.⁶ ............................ F16C 1/10; G05G 11/00
[52] U.S. Cl. .................... 188/2 D; 74/502.2; 74/489
[58] Field of Search ............................ 188/2 F, 2 D, 188/20, 19, 265, 24.11–24.22, 9–10, 21–23; 74/523, 489, 522, 526, 502.4, 502.5, 502.6, 501.5 R, 551.8, 567, 502.2; 135/67; 280/87.041; 297/5

[56] References Cited

U.S. PATENT DOCUMENTS 4,088,040  5/1978  Ross-Myring ............................ 74/489
5,279,180  1/1994  Henriksson ............................ 74/502.2
5,664,460  9/1997  Hewson .................................... 74/489
5,865,065  2/1999  Chiu ...................................... 74/502.2
5,878,625  3/1999  Hu ......................................... 74/502.2

Primary Examiner—Douglas C. Butler
Attorney, Agent, or Firm—Bacon & Thomas

[57] ABSTRACT

The braking system of a rehabilitation trolley is controlled by a grasp member having a root portion disposed within a receiving groove of a fixing seat that is attached to the handle of the trolley. The root portion includes upper and lower portions engageable with corresponding upper and lower portions of the groove to permit the grasp member to be rotated upwardly or downwardly about corresponding fulcrum points and pulling a braking wire extending through the fixing seat and secured to the root portion. The grasp member may also engage a portion of the groove to secure the member in a braking mode when the member is pulled downwardly.

2 Claims, 5 Drawing Sheets

BRAKING STRUCTURE FOR REHABILITATION TROLLEY

BACKGROUND OF THE INVENTION

1. Field of the Invention

The present invention relates to a grasp member assembly for the braking system of for a rehabilitation trolley, and especially to a simple but specific innovative structure which has only very few members but can effect the required function whether a grasp member thereon is pulled upwardly or pushed downwardly. A braking wire can be drawn for braking, and when the grasp is pushed down, an engaging angle thereof can be further embedded in its corresponding engaging groove, so that the rehabilitation trolley can be fixed in its braking state.

2. Description of the Prior Art

As is depicted in FIG. 1 a prior art rehabilitation trolley used for rehabilitation of a patient must be provided at two handles thereof with braking control grasps for controlling moving of the trolley. A patient in need of rehabilitation has inapt hands and feet, so that the patient can only operate propitiously if the braking grasps provided on the rehabilitation trolley can brake no matter whether the grasps are pulled upwardly or pushed downwardly.

An improved grasp for rehabilitation trolley (Taiwan patent application No. 81214027, as is shown in FIG. 2) was provided according to the above stated requirement; In this trolley, receiving grooves 21 pre provided in the fixing seats 20 of two handles 10, each fixing seat 20 is provided on the front interior bottom thereof with a sloping protrusion 22 above which a plain top thereof leaves an upper protrusion 23; two control grasps 30 in a closed ring shape each is provided in front of it with a receiving chamber 31, the upper edge of the opening of the receiving chamber 31 forms an upper fulcrum 32 while the lower edge of the opening forms a lower fulcrum 33, the receiving chamber 31 is pivotally provided therein with a driving member 40 by means of a pin 41, the upper end of the driving member 40 is pivotally connected with a pin 42 in the receiving chambers 21 of the fixing seat 20, the bottom of driving member 40 is connected to a braking wire 50.

When the control grasp 30 is pulled upwardly, the upper fulcrum 32 will be abutted against the wall of the driving member 40, with up-pulling force is-exerted at the pin 41, and the driving member 40 will be rotated about the pin 42 as an axis and pull the braking wire 50 rearwardly to activate the braking system. If the control grasp 30 is pushed downwardly, the lower fulcrum 33 will be abutted against the slopping protrusion 22, with pushing force also exerted on the pin 41, and the driving member 40 will be rotated about the pin 42 as an axis and also pull the braking wire 50 rearwardly to activate the braking system for braking.

The above stated braking structure for a rehabilitation trolley requires a driving member to effect pulling of the braking wire both in up pulling and down pushing of the control grasp, and it not only is complicated and expensive, but also is low in efficiency by the fact that, when it is assembled, all the members can only be successfully assembled when they are appropriately aligned mutually.

Moreover, the weight of a patient is totally placed on the braking structure for the rehabilitation trolley, when the patient takes a break during pushing the trolley the trolley must be stationary in order that the patient gets rid of danger of falling by losing stability, and only braking can keep the trolley stationary to allow the patient to relax, and unapt hands and feet of the patient require that the trolley must be kept braked, so that no danger to the patient may occur.

SUMMARY OF THE INVENTION

In view of this, the inventor of the present invention provides a simple and specific braking structure for a rehabilitation trolley, wherein, very few members are used to get an effect that the braking grasp thereof can brake no matter whether the braking grasp is pulled upwardly or pushed downwardly, a braking wire can be drawn for braking, and when the grasp is pushed down, the rehabilitation trolley can be further fixed in the braking state, so that high safety is provided.

The primary object of the present invention thus is to provide a braking structure for a rehabilitation trolley, in which a receiving groove is provided in a fixing seat of a handle of the rehabilitation trolley, the fixing seat is provided with a braking wire through hole which extends through its corresponding receiving groove provided from a lower to an upper position thereof with an engaging groove and a stop groove, the bottom of the opening of the receiving groove is provided with a stop edge; a grasp is placed with its root portion in the receiving groove, the root portion is provided with a lower protrusion of which the end is provided with an engaging angle, the lower protrusion is provided thereon with another through hole for extending therethrough the braking wire, an upper protrusion is provided above the root portion to cooperate with the above mentioned stop groove, such structure of braking grasp for the rehabilitation trolley uses very few members to get relize the braking effect so that the braking wire can be drawn for braking whether the grasp is pulled upwardly or pushed downwardly, and this can lower the cost of production.

Another object of the present invention is to provide a braking structure for the rehabilitation trolley, wherein, when the grasp is pushed down, an engaging angle thereof can be further embedded in its corresponding engaging groove, so that the rehabilitation trolley can be fixed in the braking state, and a patient using the trolley does not have to hold the grasp in the braking state, and this can thus provide safety.

The present invention will be apparent in its practical structure and other objects thereof after reading the detailed description of the preferred embodiment thereof with reference to the accompanying drawings.

DETAILED DESCRIPTION OF THE PREFERRED EMBODIMENT

Figure 1:
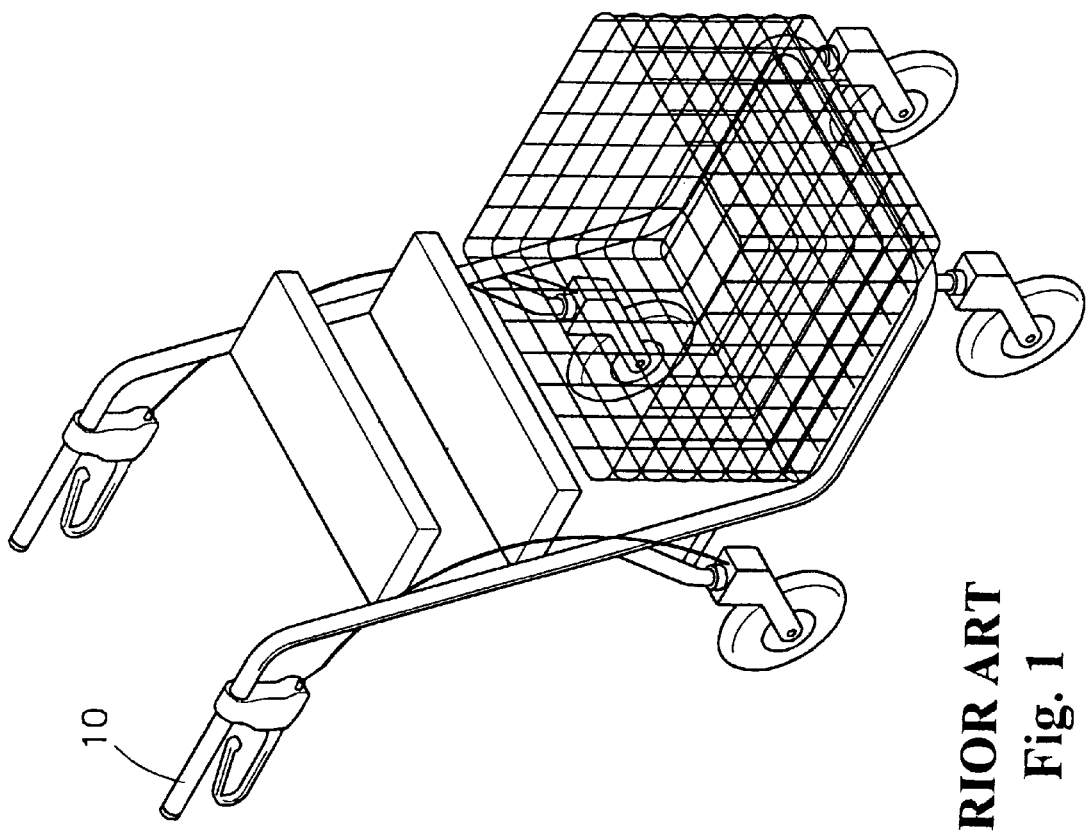
FIG. 1 is a perspective view of a rehabilitation trolley.
Figure 2:
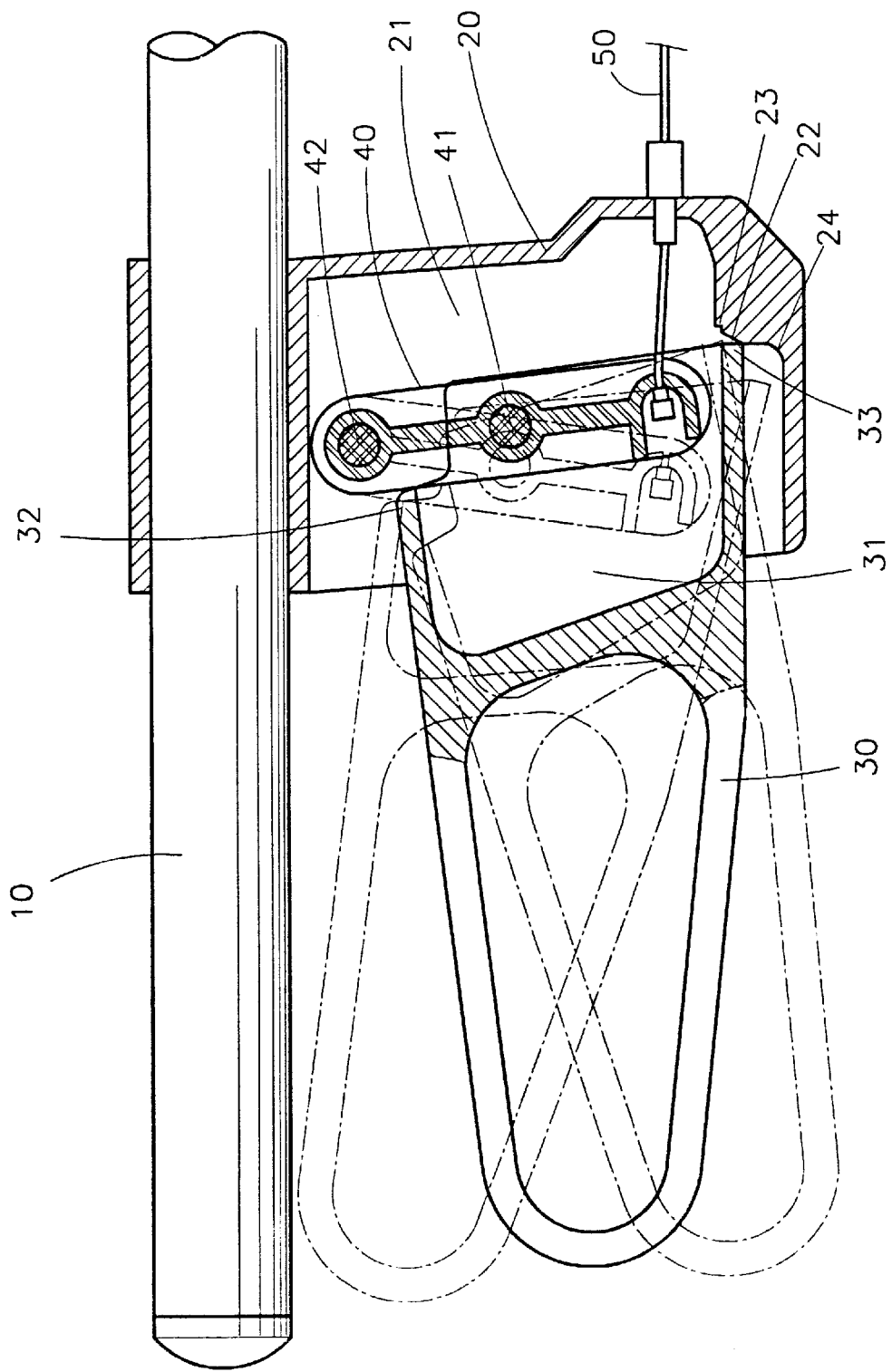
FIG. 2 is a schematic view of a conventional braking structure for a rehabilitation trolley.
Figure 3:
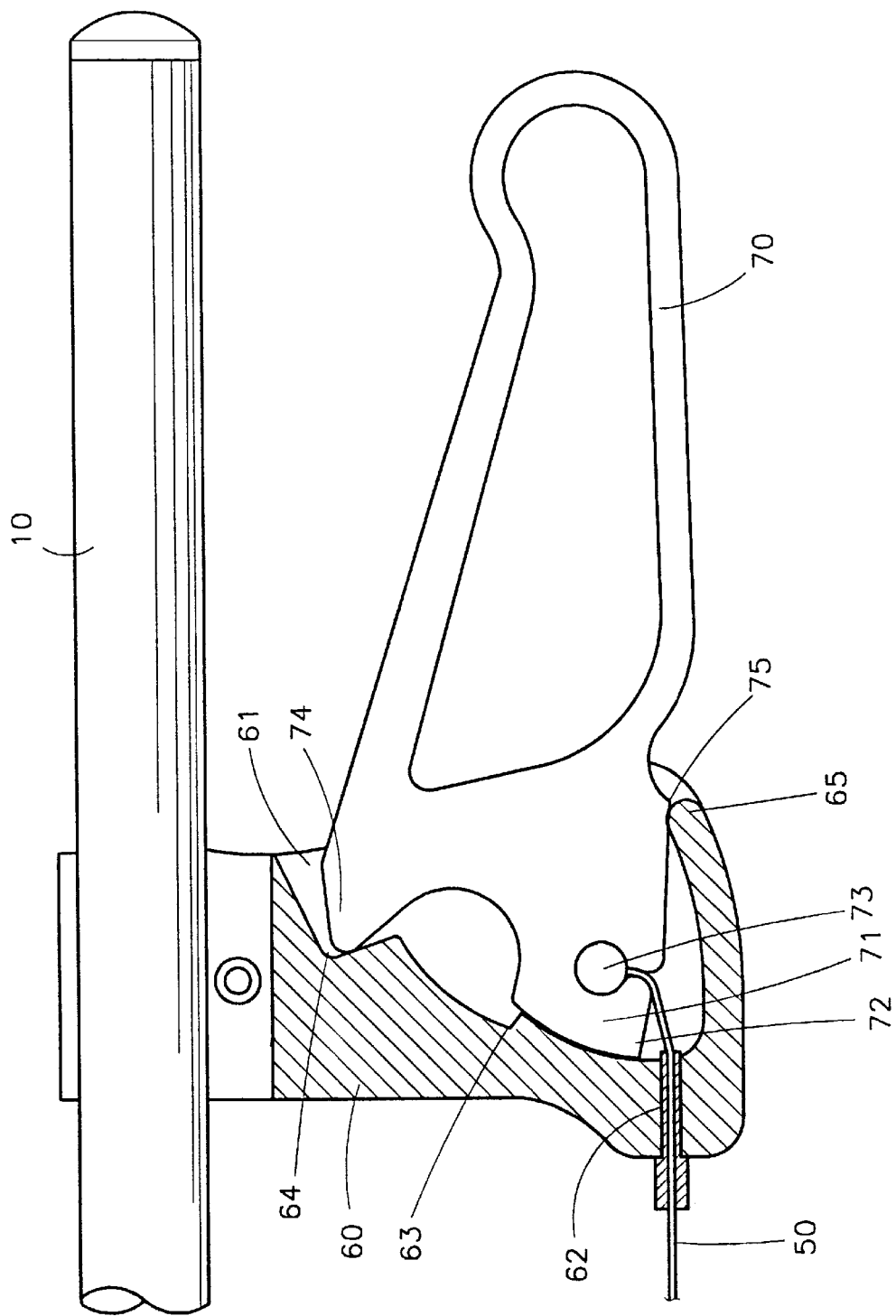
FIG. 3 is a schematic view of the present invention in a normal operation state.

Referring firstly to FIG. 3, in the braking structure for the rehabilitation trolley of the present invention, a receiving groove 61 is provided in a fixing seat 60 of a handle 10 of the rehabilitation trolley, the fixing seat 60 is provided with a braking wire 50 through hole 62 which extends through its corresponding receiving groove 61 provided from a lower to an upper position thereof with an engaging groove 63 and a stop groove 64, the bottom of the opening of the receiving groove 61 is provided with a stop edge 65; a grasp 70 is placed with its root portion in the receiving groove 61, the root portion of the grasp 70 is provided with a lower protrusion 71 of which the end is provided with an engaging angle 72, the lower protrusion 71 is provided thereon with another through hole 73 for extending therethrough the braking wire 50, a slot 77 is provided beneath the through hole 73 for holding therein the braking wire 50, the bottom of the slot 77 has a rounded turn 76 to avoid damage to the braking wire 50 after long term using, an upper protrusion 74 is provided above the root portion of the grasp 70 to cooperate with the above mentioned stop groove 64. Besides, an engaging point 75 is provided between the lower protrusion 71 and the grasp 70 to be used to abut against the stop edge 65.

Figure 4:
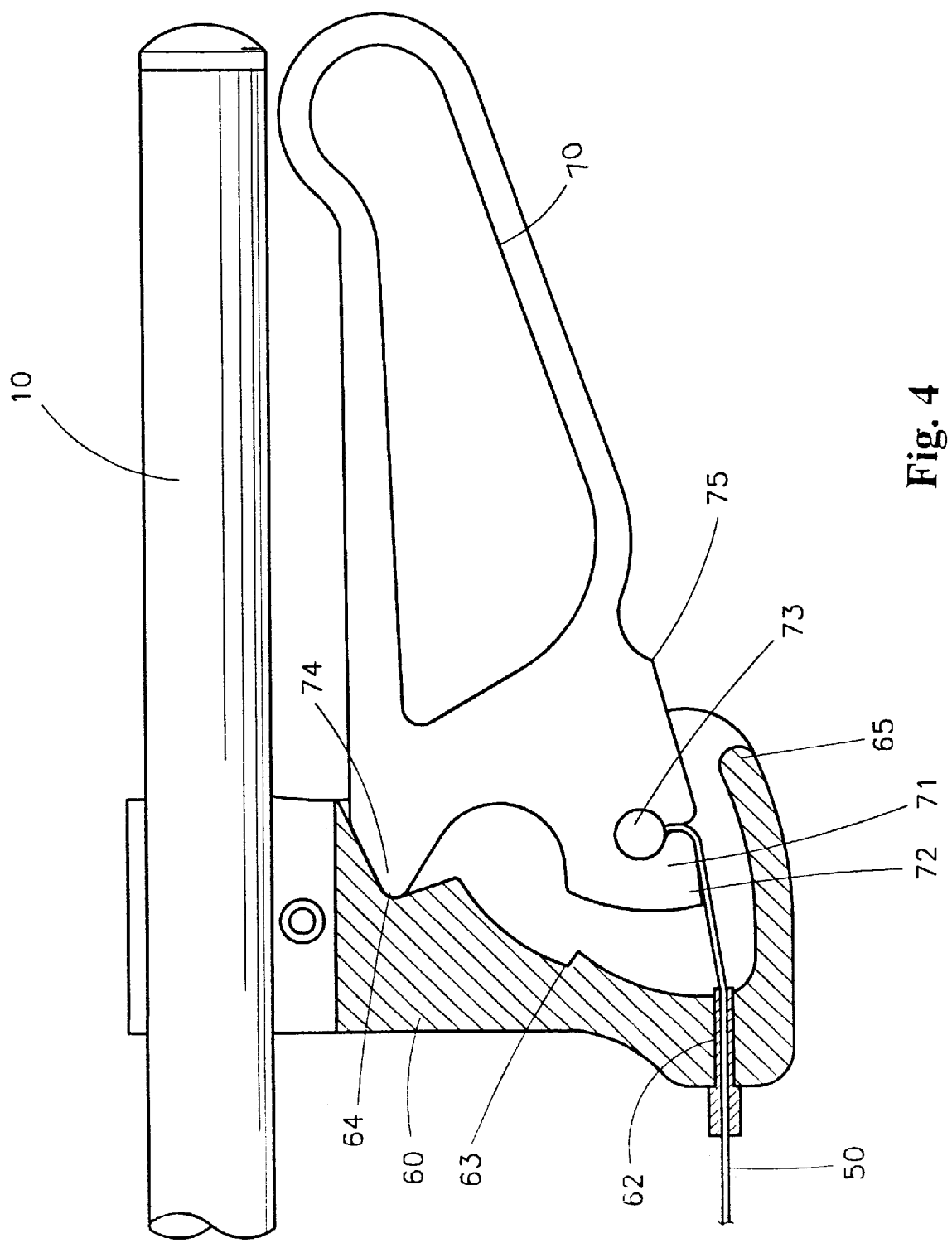
FIG. 4 is a schematic view showing up-pulling of a braking grasp of the present invention.
Figure 5:
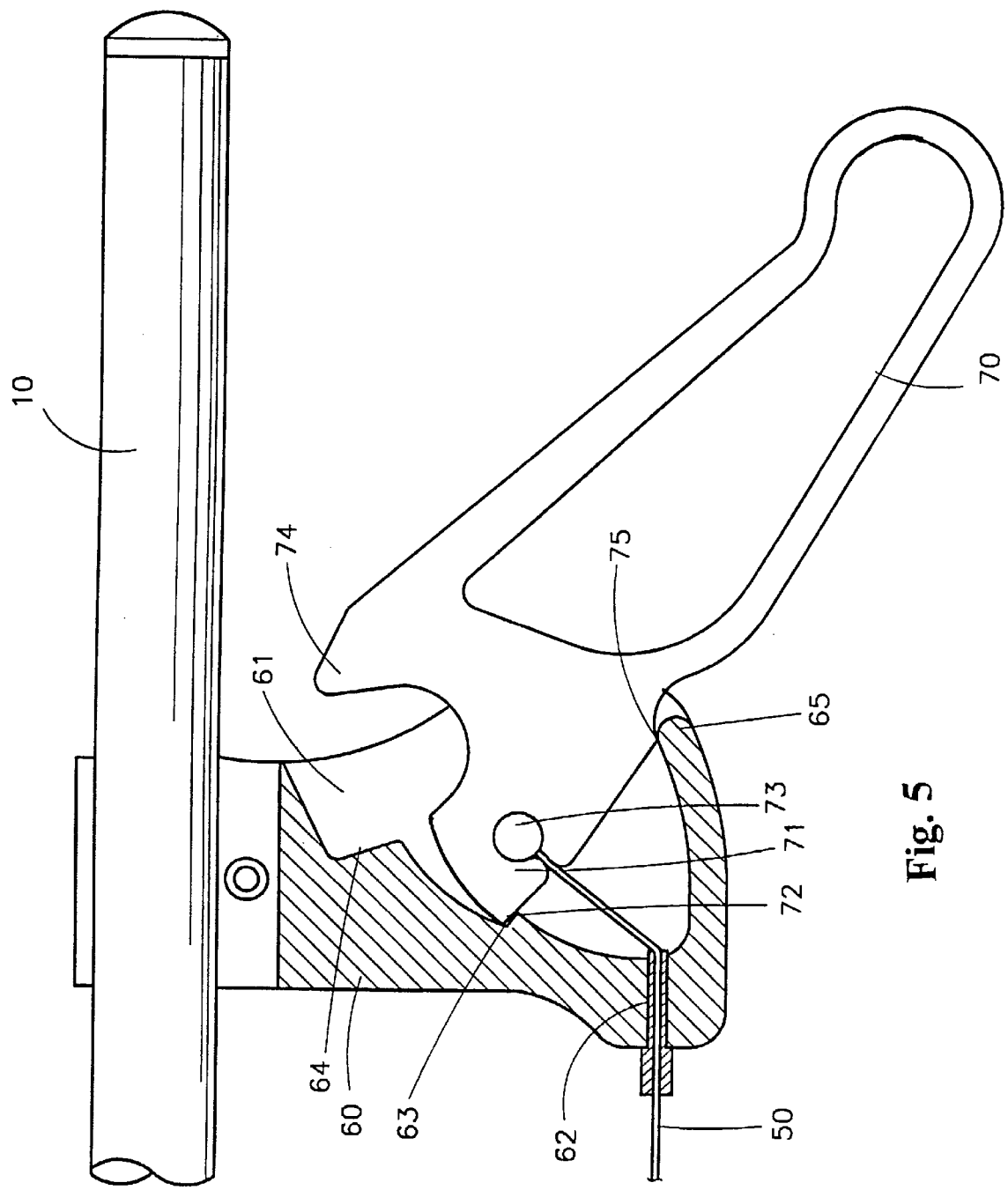
FIG. 5 is a schematic view showing down-pushing of a braking grasp of the present invention.

Further as shown in FIG. 3, when in the normal state of the present invention, by pulling the braking wire 50, the root portion of the grasp 70 is abutted tightly on the wall of the receiving groove 61, and as shown in FIG. 4, when the grasp 70 is pulled upwardly, the end of the upper protrusion 74 is engaged in the stop groove 64, then the grasp 70 is rotated upwardly taking the end of the upper protrusion 74 as a fulcrum, the braking wire 50 will be pulled via the through hole 73 on the lower protrusion 71 to control the braking system for braking; and as shown in FIG. 5, when the grasp 70 is pushed downwardly, the engaging point 75 is abutted against the stop edge 65 of the fixing seat 60, and is rotated downwardly about the stop edge 65 as a fulcrum, the braking wire 50 will be pulled via the through hole 73 on the lower protrusion 71 to control the braking system for braking.

Further as shown in FIG. 5, when the grasp 70 is pushed downwardly and is moved away from the receiving groove 61, the engaging angle 72 will be engaged with the engaiging groove 63 to fix the grasp 70 in the braking state, when the grasp 70 is pulled slightly rearwards, in a direction away from engaging groove 63, the engaging angle 72 can be released from the engaging groove 63 to remove the braking action and restore to the normal state of the trolley. Such characteristic can provide better safety for the structure of the grasp 70 of the rehabilitation trolley, for example, when the patient takes a break in moving, he can hold the rehabilitation trolley in the braking state to avoid moving of the rehabilitation trolley and making him lose stability and fall, additionally, he does not have to hold the grasp tightly during taking a rest.

The present invention stated above can have the proper braking function of a rehabilitation trolley only by cooperation of the fixing seat and the grasp thereof, it does'nt need to be assembled with pins, screws etc., this can not only lower the cost but also increase the efficiency of production, and thus has the utility value for the industry, and improves the braking function in addition to the characteristics stated above, so that safety as well as convenience in operation of the rehabilitation trolley are much improved.

Having thus described my invention, what I claim as new and desire to be secured by letters patent of the united states are:

I claim:

1. A braking grasp assembly for controlling the braking system of a rehabilitation trolley having a handle, the assembly comprising:

a) a fixing seat having an upper portion for attachment to the handle of the trolley, a grasp member, and a braking wire having a first end for attachment to the grasp member and a second end for attachment to the braking system;

b) the fixing seat including a receiving groove formed therein, a hole for receiving the first end of the braking wire therethrough, a stop groove disposed within and at an upper end of the receiving groove, and a stop edge disposed within and at a lower end of the receiving groove;

c) the grasp member including a root portion disposed within the receiving groove, the root portion having a lower protrusion with a hole formed therein for securing the first end of the braking wire to the root portion, an upper protrusion for engaging the stop groove and a lower engaging point for engaging the stop edge; and d) whereby when the grasp member is pulled upwardly, the upper protrusion engages the stop groove to cause the grasp member to rotate upwardly about the upper protrusion as a fulcrum point, and when the grasp member is pulled downwardly, the engaging point engages the stop edge to cause the grasp member to rotate downwardly about the stop edge as a fulcrum point, thereby pulling the braking wire and activating the braking system during both upward and downward pulling of the grasp member.

2. The braking grasp assembly of claim 1 wherein:

a) the receiving groove further includes an engaging groove;

b) the lower protrusion of the root portion includes an engaging angle; and c) whereby when the grasp member is pulled downwardly the engaging angle is engageable with the engaging groove to secure the grasp member in a braking mode, and when the grasp member is pulled in a direction away from the receiving groove, the engaging angle disengages from the engaging groove to remove the assembly from the braking mode.

* * * * *

UNITED STATES PATENT AND TRADEMARK OFFICE
CERTIFICATE OF CORRECTION

PATENT NO. : 5,954,161
DATED : September 21, 1999
INVENTOR(S) : Daniel Lee

It is certified that error appears in the above-identified patent and that said Letters Patent is hereby corrected as shown below:

Title page,
Item [73], Assignee, change "Apex Care Industry, Inc., Chia-Yeh Hsien, Taiwan" to -- Apex Medical Corp., Taipei, Taiwan, R.O.C. and Apex Care Industry Inc., Chia-Yih Hsien, Taiwan, R.O.C. --.

Signed and Sealed this

Eighteenth Day of May, 2004

JON W. DUDAS
*Acting Director of the United States Patent and Trademark Office*